US009701169B2

(12) United States Patent
Volin

(10) Patent No.: US 9,701,169 B2
(45) Date of Patent: Jul. 11, 2017

(54) UNIQUE ADJUSTABLE TRAILER-LOCKING SYSTEM, HAVING UNIQUE QUICK-SIZE-RELEASE, QUICK-SIZE-ASSEMBLY, AND QUICK-SIZE-SWITCH TRAILER LOCK FOR SECURELY LOCKING HITCH-BALL RECEIVERS OF ALL STANDARDIZED SIZES, AND FOR ELIMINATING CAVITIES INSIDE HITCH-BALL RECEIVERS TO PREVENT CROWBAR-INSERTION TRAILER THEFT

(71) Applicant: Dee Volin, Fairview, OR (US)

(72) Inventor: Dee Volin, Fairview, OR (US)

( * ) Notice: Subject to any disclaimer, the term of this patent is extended or adjusted under 35 U.S.C. 154(b) by 0 days.

(21) Appl. No.: 14/732,763

(22) Filed: Jun. 7, 2015

(65) Prior Publication Data
US 2015/0352917 A1    Dec. 10, 2015

Related U.S. Application Data

(60) Provisional application No. 62/009,247, filed on Jun. 8, 2014.

(51) Int. Cl.
*B60D 1/60*    (2006.01)
*B60D 1/06*    (2006.01)

(52) U.S. Cl.
CPC    *B60D 1/60* (2013.01); *B60D 1/06* (2013.01)

(58) Field of Classification Search
CPC .................................. B60D 1/06; B60D 1/60
USPC .......................................................... 280/507
See application file for complete search history.

(56) References Cited

U.S. PATENT DOCUMENTS

| 3,233,913 | A |   | 2/1966  | Brown      |              |
|-----------|---|---|---------|------------|--------------|
| 3,434,741 | A |   | 3/1969  | Grant, Jr. |              |
| 3,526,110 | A |   | 9/1970  | Foote      |              |
| 3,770,298 | A | * | 11/1973 | Phillips   | B60D 1/28 280/457 |
| 3,780,546 | A |   | 12/1973 | Longenecker |             |
| 3,857,575 | A |   | 12/1974 | Lee        |              |
| 3,884,055 | A |   | 5/1975  | Vuillemot  |              |
| 4,291,557 | A |   | 9/1981  | Bulle      |              |
| 4,571,964 | A |   | 2/1986  | Bratzler   |              |
| 4,577,884 | A |   | 3/1986  | Harris     |              |
| 4,648,618 | A |   | 3/1987  | Utman      |              |
| 4,730,841 | A |   | 3/1988  | Ponder     |              |
| 4,756,172 | A |   | 7/1988  | Weaver     |              |
| 4,861,062 | A | * | 8/1989  | Stidsen    | B60D 1/605 280/507 |

(Continued)

*Primary Examiner* — Joseph Rocca
*Assistant Examiner* — Felicia L Brittman

(57) ABSTRACT

A unique adjustable trailer-locking system comprises a locking ball, a lock, a locking pin, a key, and first, second, third, and fourth size-adjusting caps. The locking ball has a through hole. Each of the first, second, third, and fourth size-adjusting caps has a dome shape and a hollow shaft attached to its center. Each of the hollow shafts can be inserted into the through hole or another hollow shaft to assemble, disassemble, and switch the size of the locking ball, to fit inside a hitch-ball receiver of one of standardized sizes to eliminate all the gaps therebetween, to prevent a crowbar from being inserted therebetween to pry the locking ball off. The locking pin is for being inserted through a hitch-ball-receiver lever and through the lock. The key is for turning the lock to secure the locking pin and the hitch-ball-receiver lever.

8 Claims, 14 Drawing Sheets

(56) References Cited

U.S. PATENT DOCUMENTS

| | | | |
|---|---|---|---|
| 5,169,168 A * | 12/1992 | Harry | B60D 1/06 |
| | | | 280/511 |
| 5,433,467 A * | 7/1995 | Easterwood | B60D 1/60 |
| | | | 280/504 |
| 5,433,468 A * | 7/1995 | Dixon | B60D 1/60 |
| | | | 280/507 |
| 5,573,263 A | 11/1996 | Denny | |
| 5,681,053 A | 10/1997 | Misukanis | |
| 5,700,024 A | 12/1997 | Upchurch | |
| 5,752,398 A | 5/1998 | Villalon, Jr. | |
| 5,775,139 A | 7/1998 | Sellers | |
| 5,937,679 A | 8/1999 | Villalon, Jr. | |
| D419,122 S | 1/2000 | Stech | |
| 6,070,441 A | 6/2000 | Bernstrom | |
| D436,064 S | 1/2001 | Niswanger | |
| 6,244,614 B1 | 6/2001 | Bonvillain | |
| 6,419,258 B1 | 7/2002 | Grote | |
| 6,598,432 B1 | 7/2003 | Dwyer | |
| 6,666,051 B1 | 12/2003 | Li | |
| 6,722,686 B2 | 4/2004 | Koy | |
| D506,121 S | 6/2005 | Falconer | |
| 6,976,695 B1 * | 12/2005 | Smith, III | B60D 1/28 |
| | | | 280/507 |
| 7,107,799 B1 | 9/2006 | Marley | |
| 7,204,508 B1 | 4/2007 | Hsai | |
| 7,300,068 B1 | 11/2007 | Johnsen | |
| 7,469,919 B2 | 12/2008 | Kalous | |
| D615,462 S | 5/2010 | Barrette | |
| 7,712,763 B2 | 5/2010 | Lovenberg | |
| 7,909,351 B2 | 3/2011 | Hui | |
| 8,020,885 B2 | 9/2011 | Cuellar | |
| 8,083,249 B2 | 12/2011 | Most | |
| 8,113,532 B2 | 2/2012 | Garton | |
| 8,151,605 B1 | 4/2012 | Gustafson | |
| 8,235,411 B2 | 8/2012 | Works | |
| 8,342,559 B1 | 1/2013 | MacKarvich | |
| D690,241 S | 9/2013 | Gustafson | |
| 8,556,288 B1 | 10/2013 | Bale | |
| 2007/0138763 A1 | 6/2007 | George | |
| 2012/0200067 A1 | 8/2012 | Bonham | |

* cited by examiner

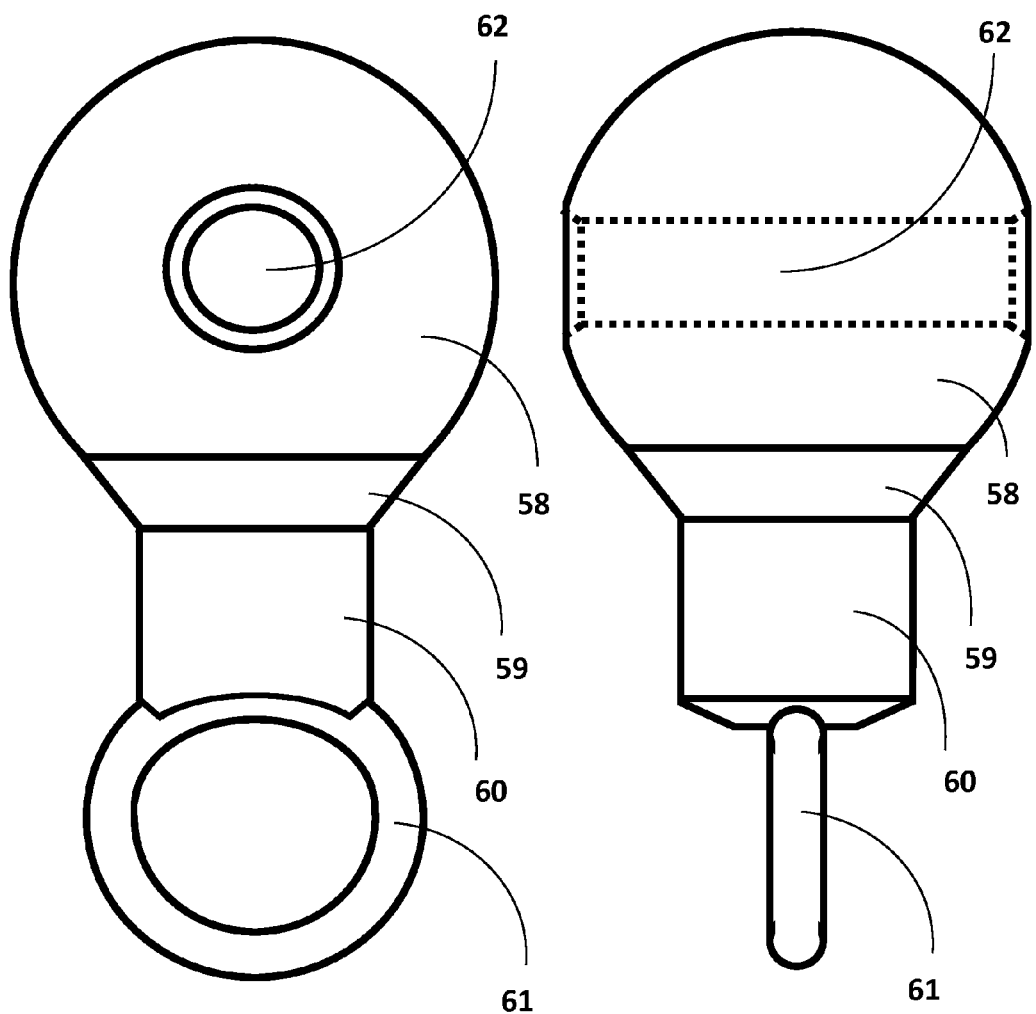

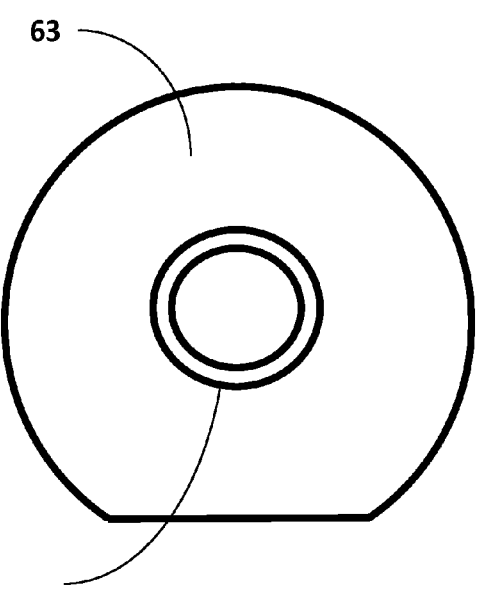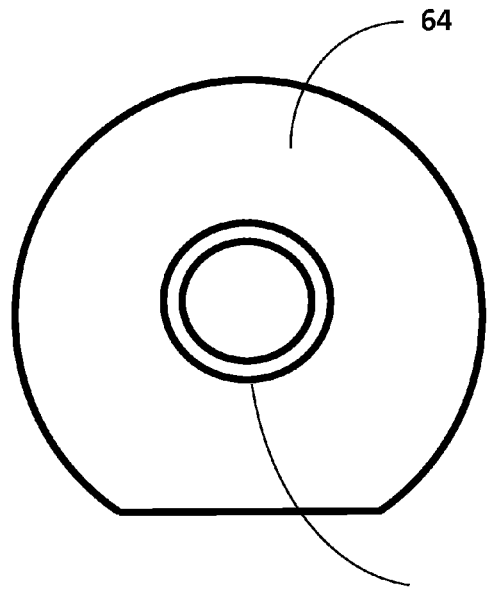
FIG. 5  FIG. 6
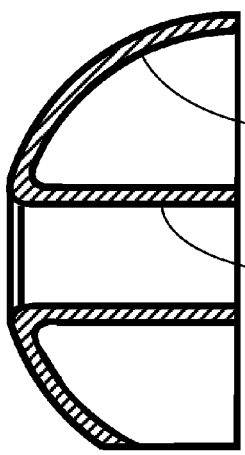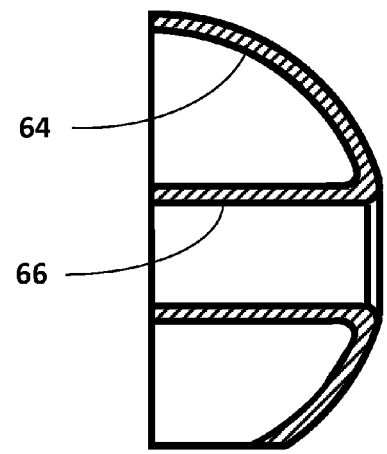
FIG. 7

UNIQUE ADJUSTABLE TRAILER-LOCKING SYSTEM, HAVING UNIQUE QUICK-SIZE-RELEASE, QUICK-SIZE-ASSEMBLY, AND QUICK-SIZE-SWITCH TRAILER LOCK FOR SECURELY LOCKING HITCH-BALL RECEIVERS OF ALL STANDARDIZED SIZES, AND FOR ELIMINATING CAVITIES INSIDE HITCH-BALL RECEIVERS TO PREVENT CROWBAR-INSERTION TRAILER THEFT

FIELD OF THE INVENTION

The present invention relates to a unique adjustable trailer-locking system. Particularly, the present invention relates to a unique adjustable trailer-locking system, having:
  a) Unique capability of quick trailer-lock-size release,
  b) Unique capability of quick trailer-lock-size assembly,
  c) Unique capability of quick trailer-lock-size switch,
  d) Unique capability of securely locking hitch-ball receivers of all three standardized sizes (1⅞-inch hitch-ball receiver, 2-inch hitch-ball receiver, and 2 5/16-inch hitch-ball receiver), and
  e) Unique capability of eliminating all cavities or gaps between the unique adjustable trailer-locking system and hitch-ball receivers of all three standardized sizes, to prevent a crowbar from being inserted therebetween to pry the unique adjustable trailer-locking system off or to damage it, to prevent trailer theft.

DESCRIPTION OF THE PRIOR ART

A number of trailer locks (hitch-ball-receiver locks) have been introduced.
U.S. Pat. No. 3,233,913, issued on 1966 Feb. 8, to T. P. Brown;
U.S. Pat. No. 3,434,741, issued on 1969 Mar. 25, to W. H. Grant, Jr;
U.S. Pat. No. 3,526,110, issued on 1970 Sep. 1, to D. J. Foote;
U.S. Pat. No. 3,780,546, issued on 1973 Dec. 25, to Longenecker, Ernst A.;
U.S. Pat. No. 3,857,575, issued on 1974 Dec. 31, to Lee, James F.;
U.S. Pat. No. 3,884,055, issued on 1975 May 20, to Vuillemot, Dale F.;
U.S. Pat. No. 4,291,557, issued on 1981 Sep. 29, to Bulle, Marshall;
U.S. Pat. No. 4,571,964, issued on 1986 Feb. 25, to Bratzler, William R.;
U.S. Pat. No. 4,577,884, issued on 1986 Mar. 25, to Harris, Joe L.;
U.S. Pat. No. 4,648,618, issued on 1987 Mar. 10, to Utman, Leslie H.;
U.S. Pat. No. 4,730,841, issued on 1988 Mar. 15, to Ponder, Joe L.;
U.S. Pat. No. 4,756,172, issued on 1988 Jul. 12, to Weaver, Marcus S.;
U.S. Pat. No. 5,573,263, issued on 1996 Nov. 12, to Denny, Martin L.;
U.S. Pat. No. 5,681,053, issued on 1997 Oct. 28, to Misukanis, Edward V.;
U.S. Pat. No. 5,700,024, issued on 1997 Dec. 23, to Upchurch, James W.;
U.S. Pat. No. 5,752,398, issued on 1998 May 19, to Villalon, Jr., Severo Leonard;
U.S. Pat. No. 5,775,139, issued on 1998 Jul. 7, to Sellers, Fred J.;
U.S. Pat. No. 5,937,679, issued on 1999 Aug. 17, to Villalon, Jr., Severo Leonard;
U.S. Pat. No. 6,070,441, issued on 2000 Jun. 6, to Bernstrom, John C.;
U.S. Pat. No. 6,244,614, issued on 2001 Jun. 12, to Bonvillain, Gary J;
U.S. Pat. No. 6,419,258, issued on 2002 Jul. 16, to Grote, Jeff M.;
U.S. Pat. No. 6,598,432, issued on 2003 Jul. 29, to Dwyer, John A.;
U.S. Pat. No. 6,666,051, issued on 2003 Dec. 23, to Li, Show-Mon;
U.S. Pat. No. 6,722,686, issued on 2004 Apr. 20, to Koy, Tim Vander;
U.S. Pat. No. 7,107,799, issued on 2006 Sep. 19, to Marley, Kenneth Ray;
U.S. Pat. No. 7,204,508, issued on 2007 Apr. 17, to Hsai, Chin-Hui;
U.S. Pat. No. 7,300,068, issued on 2007 Nov. 27, to Johnsen, Roger L.;
U.S. Pat. No. 7,469,919, issued on 2008 Dec. 30, to Kalous, Scott;
U.S. Pat. No. 7,712,763, issued on 2010 May 11, to Lovenberg, Joel L;
U.S. Pat. No. 7,909,351, issued on 2011 Mar. 22, to Hui, Hsai Chin;
U.S. Pat. No. 8,020,885, issued on 2011 Sep. 20, to Cuellar, Maja A.;
U.S. Pat. No. 8,083,249, issued on 2011 Dec. 27, to Most, Toby;
U.S. Pat. No. 8,113,532, issued on 2012 Feb. 14, to Garton, James R.;
U.S. Pat. No. 8,151,605, issued on 2012 Apr. 10, to Gustafson, Kenneth G.;
U.S. Pat. No. 8,235,411, issued on 2012 Aug. 7, to Works, Joseph W.;
U.S. Pat. No. 8,342,559, issued on 2013 Jan. 1, to MacKarvich, Charles J.;
U.S. Pat. No. 8,556,288, issued on 2013 Oct. 15, to Bale, Bruce H.;
U.S. Pat. No. D436,064, issued on 2001 Jan. 9, to Niswanger, Raymond A.;
U.S. Pat. No. D506,121, issued on 2005 Jun. 14, to Falconer, Robert P.;
U.S. Pat. No. D615,462, issued on 2010 May 11, to Barrette, Jeffrey N.;
U.S. Pat. No. D690,241, issued on 2013 Sep. 24, to Gustafson, Kenneth Gordon;
U.S. Pat. No. 20070138763, issued on 2007 Jun. 21, to George, Edward St.; and
U.S. Pat. No. 20120200067, issued on 2012 Aug. 9, to Bonham, Brent disclose a variety of inventions related to trailer locks (hitch-ball-receiver locks).

DISADVANTAGES OF THE PRIOR ART

Prior-art trailer locks have had many disadvantages. For example, FIG. 1 (PRIOR ART) illustrates a prior-art trailer lock 50 (having a 1⅞-inch diameter), not being able to lock a hitch-ball receiver (having a 2-inch diameter or a 2 5/16-inch diameter), and not being able to eliminate multiple cavities 51, 52, 53, and 54 between prior-art trailer lock 50 and the hitch-ball receiver. As a result, a crowbar could be inserted into multiple cavities 51, 52, 53, and 54 and pry out prior-art trailer lock 50.

For another example, FIG. 2 (PRIOR ART) illustrates another prior-art trailer lock 55, not being able to eliminate multiple cavities 51, 51, 53, and 54 inside a hitch-ball receiver. As a result, hammering forces in the directions of arrows 56 and 57 could bend prior-art trailer lock 55 toward multiple cavities 51, 51, 53, and 54, and disable prior-art trailer lock 55.

The prior art have failed to solve many problems associated with such trailer locks (hitch-ball-receiver locks), as follows:

1) No prior art mentions or discloses any unique adjustable trailer-locking system, having a unique quick-size-release, quick-size-assembly, and quick-size-switch trailer lock. Therefore, the prior art:
   a) Cannot snuggly fit inside a hitch-ball receiver of any of all three standardized sizes (for example, a 1⅞-inch hitch-ball receiver, a 2-inch hitch-ball receiver, and a 2 5/16-inch hitch-ball receiver);
   b) Cannot prevent a crowbar from being inserted between the unique quick-size-release, quick-size-assembly, and quick-size-switch trailer lock and a hitch-ball receiver of any of all three standardized sizes to pry it off or to damage it, to prevent trailer theft;
   c) Cannot prevent a crowbar from prying the unique quick-size-release, quick-size-assembly, and quick-size-switch trailer lock off a hitch-ball receiver of any of all three standardized sizes; and
   d) Cannot prevent trailer theft.
2) No prior art mentions or discloses any unique adjustable trailer-locking system, having the unique quick-size-release, quick-size-assembly, and quick-size-switch trailer lock. Therefore, the prior art:
   a) Cannot eliminate the cavities or gaps between the unique quick-size-release, quick-size-assembly, and quick-size-switch trailer lock and a hitch-ball receiver of any of all three standardized sizes (for example, a 1⅞-inch hitch-ball receiver, a 2-inch hitch-ball receiver, and a 2 5/16-inch hitch-ball receiver), to prevent trailer theft;
   b) Cannot prevent a crowbar from being inserted between the unique quick-size-release, quick-size-assembly, and quick-size-switch trailer lock and a hitch-ball receiver of any of all three standardized sizes to pry it off; and
   c) Cannot prevent trailer theft.
3) No prior art mentions or discloses any unique adjustable trailer-locking system, having the unique quick-size-release, quick-size-assembly, and quick-size-switch trailer lock. Therefore, the prior art:
   a) Do not have the capabilities of quick size release, quick size assembly, and quick size switch;
   b) Require buying many trailer locks of three standardized sizes for hitch-ball receivers of three standardized sizes (for example, a 1⅞-inch hitch-ball receiver, a 2-inch hitch-ball receiver, and a 2 5/16-inch hitch-ball receiver); and
   c) Waste materials, spaces, time, and money.
4) No prior art mentions or discloses any unique adjustable trailer-locking system, having the unique quick-size-release, quick-size-assembly, and quick-size-switch trailer lock. Therefore, the prior art:
   a) Cause inconvenience by not being able to switch itself from one size to another;
   b) Cause inefficient protection by not being able to switch itself from one size to another; and
   c) Cause difficulty of use by not being able to switch itself from one size to another.
5) No prior art mentions or discloses any unique adjustable trailer-locking system, having the unique quick-size-release, quick-size-assembly, and quick-size-switch trailer lock. Therefore, the prior art:
   a) Are cumbersome to operate;
   b) Are expensive to manufacture; and
   c) Increase production costs.
6) No prior art mentions or discloses any unique adjustable trailer-locking system, having the unique quick-size-release, quick-size-assembly, and quick-size-switch trailer lock. Therefore, the prior art:
   a) Cannot withstand hammering forces to prevent trailer theft; and
   b) Cannot eliminate the problem of prior-art trailer locks defeated by a crowbar and a hammer; and
   c) Cannot deter trailer theft by not being able to snuggly fit inside a hitch-ball receiver of any of all three standardized sizes to eliminate all cavities or gaps between the unique quick-size-release, quick-size-assembly, and quick-size-switch trailer lock and the hitch-ball receivers of all three standardized sizes, to prevent a crowbar from being inserted therebetween to pry it off.
7) No prior art mentions or discloses any unique adjustable trailer-locking system, having the unique quick-size-release, quick-size-assembly, and quick-size-switch trailer lock. Therefore, the prior art:
   a) Require tools to operate;
   b) Are difficult to operate; and
   c) Are unreliable.
8) No prior art mentions or discloses any unique adjustable trailer-locking system, having the unique quick-size-release, quick-size-assembly, and quick-size-switch trailer lock. Therefore, the prior art:
   a) Are cumbersome;
   b) Are expensive;
   c) Are unsafe to operate; and
   d) Cause a lot of personal injuries.

OBJECTS AND ADVANTAGES OF THE INVENTION

Prior-art trailer locks have had many disadvantages. For example, FIG. 1 (PRIOR ART) illustrates a prior-art trailer lock 50 (having a 1⅞-inch diameter), not being able to lock a hitch-ball receiver (having a 2-inch diameter or a 2 5/16-inch diameter), and not being able to eliminate multiple cavities 51, 52, 53, and 54 between prior-art trailer lock 50 and the hitch-ball receiver. As a result, a crowbar could be inserted into multiple cavities 51, 52, 53, and 54 and pry out prior-art trailer lock 50.

For another example, FIG. 2 (PRIOR ART) illustrates another prior-art trailer lock 55, not being able to eliminate multiple cavities 51, 51, 53, and 54 inside a hitch-ball receiver. As a result, hammering forces in the directions of arrows 56 and 57 could bend prior-art trailer lock 55 toward multiple cavities 51, 51, 53, and 54, and disable prior-art trailer lock 55.

The present invention substantially departs from the conventional concepts and designs of the prior art. In doing so, the present invention provides a unique adjustable trailer-locking system, having multiple unique capabilities of quick size release, quick size assembly, and quick size switch, all of which have many unique functions and advantages, which overcome all the disadvantages of the prior art, as follows:

1) It is an object of the present invention to provide a unique adjustable trailer-locking system, having a unique quick-size-release, quick-size-assembly, and quick-size-switch trailer lock, which can:
   a) Snuggly fit inside a hitch-ball receiver of any of all three standardized sizes (for example, a 1⅞-inch hitch-ball receiver, a 2-inch hitch-ball receiver, and a 2 5/16-inch hitch-ball receiver);
   b) Prevent a crowbar from being inserted between the unique quick-size-release, quick-size-assembly, and quick-size-switch trailer lock and a hitch-ball receiver of any of all three standardized sizes to pry it off or to damage it, to prevent trailer theft;
   c) Prevent a crowbar from prying the unique quick-size-release, quick-size-assembly, and quick-size-switch trailer lock off a hitch-ball receiver of any of all three standardized sizes; and
   d) Prevent trailer theft.
2) It is another object of the present invention to provide the unique adjustable trailer-locking system, having the unique quick-size-release, quick-size-assembly, and quick-size-switch trailer lock, which can:
   a) Eliminate the cavities or gaps between the unique quick-size-release, quick-size-assembly, and quick-size-switch trailer lock and a hitch-ball receiver of any of all three standardized sizes (for example, a 1⅞-inch hitch-ball receiver, a 2-inch hitch-ball receiver, and a 2 5/16-inch hitch-ball receiver), to prevent trailer theft;
   b) Prevent a crowbar from being inserted between the unique quick-size-release, quick-size-assembly, and quick-size-switch trailer lock and a hitch-ball receiver of any of all three standardized sizes to pry it off; and
   c) Prevent trailer theft.
3) It is still another object of the present invention to provide the unique adjustable trailer-locking system, having the unique quick-size-release, quick-size-assembly, and quick-size-switch trailer lock, which can:
   a) Have the capabilities of quick size release, quick size assembly, and quick size switch;
   b) Eliminate the needs for buying many trailer locks of three standardized sizes for many hitch-ball receivers of three standardized sizes (for example, a 1⅞-inch hitch-ball receiver, a 2-inch hitch-ball receiver, and a 2 5/16-inch hitch-ball receiver); and
   c) Save materials, spaces, time, and money.
4) It is a further object of the present invention to provide the unique adjustable trailer-locking system, having the unique quick-size-release, quick-size-assembly, and quick-size-switch trailer lock, which can:
   a) Offer convenience by being able to quickly and easily switch itself from one size to another;
   b) Offer protection by being able to quickly and easily switch itself from one size to another; and
   c) Offer ease of use by being able to quickly and easily switch itself from one size to another.
5) It is an even further object of the present invention to provide the unique adjustable trailer-locking system, having the unique quick-size-release, quick-size-assembly, and quick-size-switch trailer lock, which can:
   a) Be simple to operate;
   b) Be simple to manufacture; and
   c) Reduce production costs.
6) It is still another object of the present invention to provide the unique adjustable trailer-locking system, having the unique quick-size-release, quick-size-assembly, and quick-size-switch trailer lock, which can:
   a) Withstand hammering forces better than the prior-art trailer locks to prevent trailer theft; and
   b) Eliminate the problem of prior-art trailer locks defeated by a crowbar and a hammer; and
   c) Deter trailer theft by snuggly fitting inside a hitch-ball receiver of any of all three standardized sizes to eliminate all cavities between the unique quick-size-release, quick-size-assembly, and quick-size-switch trailer lock and the hitch-ball receivers of all three standardized sizes, to prevent a crowbar from being inserted therebetween to pry it off.
7) It is yet a further object of the present invention to provide the unique adjustable trailer-locking system, having the unique quick-size-release, quick-size-assembly, and quick-size-switch trailer lock, which can:
   a) Require no tool to operate;
   b) Be easy to operate; and
   c) Be reliable.
8) It is still an even further object of the present invention to provide the unique adjustable trailer-locking system, having the unique quick-size-release, quick-size-assembly, and quick-size-switch trailer lock, which can:
   a) Be compact;
   b) Be affordable;
   c) Be safe to operate; and
   d) Eliminate personal injuries.

Other objects and advantages of the present invention will become apparent from the consideration of the accompanying drawings and the ensuing description.

BRIEF DESCRIPTION OF THE DRAWINGS

FIG. 3 illustrates a front view of the unique quick-size-release, quick-size-assembly, and quick-size-switch trailer lock.

FIG. 4 illustrates a side view of the unique quick-size-release, quick-size-assembly, and quick-size-switch trailer lock.

FIG. 5 illustrates a front view of a first size-adjusting cap.

FIG. 6 illustrates a front view of a second size-adjusting cap.

FIG. 7 illustrates a cross-sectional view of the first size-adjusting cap.

SUMMARY OF THE INVENTION

Figure 1:
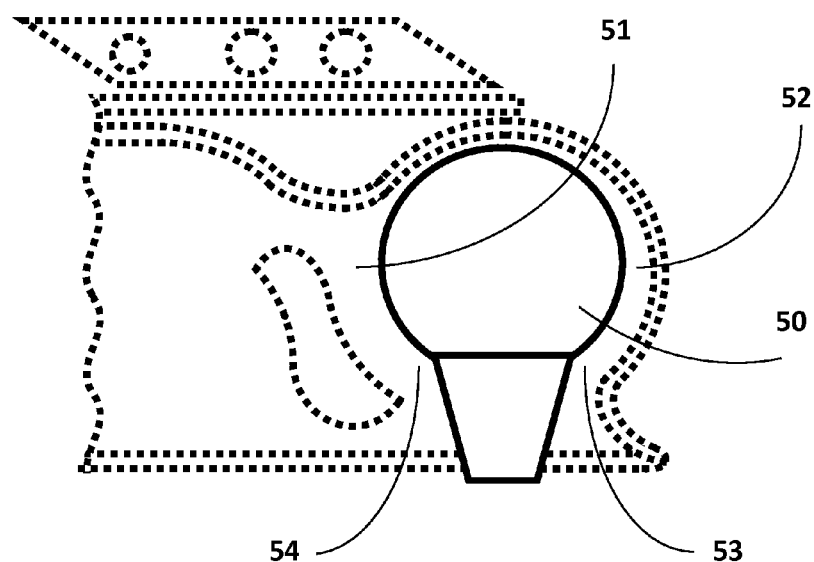
FIG. 1 (PRIOR ART) illustrates a prior-art-ball trailer lock for locking a hitch-ball receiver.

A unique adjustable trailer-locking system comprises a locking ball, a lock, a locking pin, a key, and first, second, third, and fourth size-adjusting caps. The locking ball has a through hole. Each of the first, second, third, and fourth size-adjusting caps has a dome shape and a hollow shaft attached to its center. Each of the hollow shafts can be inserted into the through hole or another one of the hollow shafts to quickly and easily assemble, disassemble, and switch the locking ball from one size to another, to snuggly fit inside a hitch-ball receiver of any of all three standardized sizes (1⅞ inches, 2 inches, and 2⁵⁄₁₆ inches) to eliminate all the cavities or gaps therebetween, to prevent a crowbar from being inserted therebetween to pry the locking ball off or to damage it, to prevent trailer theft. The locking pin is for being inserted through a hitch-ball-receiver lever and through the lock. The key is for turning the lock to secure the locking pin and the hitch-ball-receiver lever, to lock the locking ball snuggly inside hitch-ball receivers of all three standardized sizes, without any cavities or gaps therebetween.

DETAILED DESCRIPTION OF THE INVENTION

Component

Referring to FIGS. 3, 4, 5, 6, 7, 8, 9, 10, 11, 12, and 13, the unique adjustable trailer-locking system (having the unique quick-size-release, quick-size-assembly, and quick-size-switch trailer lock with the capabilities of quick size release, quick size assembly, and quick size switch to snuggly fit inside hitch-ball receivers of all three standardized sizes, to eliminate the cavities or gaps between the unique quick-size-release, quick-size-assembly, and quick-size-switch trailer lock and the hitch-ball receivers of all three standardized sizes, to better withstand hammering forces to prevent trailer theft, to eliminate the needs for buying many trailer locks of all three standardized sizes, to offer safety and convenience, and to save materials, spaces, time, and money) comprises:
1) a locking ball 58,
2) a locking-ball neck 59,
3) a locking-ball body 60,
4) a locking-ball ring 61,
5) a locking-ball through-hole 62,
6) a first size-adjusting cap 63,
7) a second size-adjusting cap 64,
8) a first hollow shaft 65,
9) a second hollow shaft 66,
10) a third size-adjusting cap 67,
11) a fourth size-adjusting cap 68,
12) a third solid shaft 69,
13) a fourth solid shaft 70,
14) a cylindrical lock 71,
15) a cylindrical-lock locking hole 72,
16) a cylindrical-lock key 73,
17) a cylindrical-lock key hole 74,
18) a locking-pin handle 75,
19) a locking-pin body 76,
20) a locking-pin tip 77, and
21) a plurality of locking notches 78.

Material

Referring to FIGS. 3, 4, 5, 6, 7, 8, 9, 10, 11, 12, and 13:
1) Locking ball 58 is made of rigid or semi-rigid material.
2) Locking-ball neck 59 is made of rigid or semi-rigid material.
3) Locking-ball body 60 is made of rigid or semi-rigid material.
4) Locking-ball ring 61 is made of rigid or semi-rigid material.
5) Locking-ball through-hole 62 is made of empty space.
6) First size-adjusting cap 63 is made of rigid or semi-rigid material.
7) Second size-adjusting cap 64 is made of rigid or semi-rigid material.
8) First hollow shaft 65 is made of rigid or semi-rigid material.
9) Second hollow shaft 66 is made of rigid or semi-rigid material.
10) Third size-adjusting cap 67 is made of rigid or semi-rigid material.
11) Fourth size-adjusting cap 68 is made of rigid or semi-rigid material.
12) Third solid shaft 69 is made of rigid or semi-rigid material.
13) Fourth solid shaft 70 is made of rigid or semi-rigid material.
14) Cylindrical lock 71 is made of metallic material.
15) Cylindrical-lock locking hole 72 is made of empty space.
16) Cylindrical-lock key 73 is made of metallic material.
17) Cylindrical-lock key hole 74 is made of empty space.
18) Locking-pin handle 75 is made of metallic material.
19) Locking-pin body 76 is made of metallic material.
20) Locking-pin tip 77 is made of metallic material.
21) Locking notches 78 each are made of empty space.

Shape

Referring to FIGS. 3, 4, 5, 6, 7, 8, 9, 10, 11, 12, and 13:
1) Locking ball 58 has a global shape and a cross-section of a ring shape.
2) Locking-ball neck 59 has a frustum shape and a cross-section of a round shape.
3) Locking-ball body 60 has a cylindrical shape and a cross-section of a round shape.
4) Locking-ball ring 61 has a ring shape and a cross-section of a ring shape.
5) Locking-ball through-hole 62 has a cylindrical shape and a cross-section of a round shape.
6) First size-adjusting cap 63 has a ring shape and a cross-section of a ring shape.
7) Second size-adjusting cap 64 has a ring shape and a cross-section of a ring shape.

8) First hollow shaft 65 has a cylindrical shape and a cross-section of a ring shape.
9) Second hollow shaft 66 has a cylindrical shape and a cross-section of a ring shape.
10) Third size-adjusting cap 67 has a ring shape and a cross-section of a ring shape.
11) Fourth size-adjusting cap 68 has a ring shape and a cross-section of a ring shape.
12) Third solid shaft 69 has a cylindrical shape and a cross-section of a round shape.
13) Fourth solid shaft 70 has a cylindrical shape and a cross-section of a round shape.
14) Cylindrical lock 71 has a cylindrical shape and a cross-section of a round shape.
15) Cylindrical-lock locking hole 72 has a cylindrical shape and a cross-section of a round shape.
16) Cylindrical-lock key 73 has a key shape and a cross-section of a rectangular shape.
17) Cylindrical-lock key hole 74 has a shaft shape and a cross-section of a rectangular shape.
18) Locking-pin handle 75 has a cylindrical shape and a cross-section of a round shape.
19) Locking-pin body 76 has a cylindrical shape and a cross-section of a round shape.
20) Locking-pin tip 77 has a frustum shape and a cross-section of a round shape.
21) Locking notches 78 each have a ring shape and a cross-section of a ring shape.

Connection

Referring to FIGS. 3, 4, 5, 6, 7, 8, 9, 10, 11, 12, and 13:
1) Locking ball 58 is molded to one end of locking-ball neck 59 (FIGS. 3 and 4).
2) Locking-ball neck 59 is molded to locking ball 58.
3) Locking-ball body 60 is molded to another end of locking-ball neck 59.
4) Locking-ball ring 61 is molded to locking-ball body 60.
5) Locking-ball through-hole 62 is molded through locking ball 58.
6) First size-adjusting cap 63 is molded to one end of first hollow shaft 65 (FIGS. 5, 6, and 7).
7) Second size-adjusting cap 64 is molded to one end of second hollow shaft 66.
8) First hollow shaft 65 is molded to first size-adjusting cap 63.
9) Second hollow shaft 66 is molded to second size-adjusting cap 64.
10) Third size-adjusting cap 67 is molded to one end of third solid shaft 69 (FIGS. 8, 9, and 10).
11) Fourth size-adjusting cap 68 is molded to one end of fourth solid shaft 70.
12) Third solid shaft 69 is molded to third size-adjusting cap 67.
13) Fourth solid shaft 70 is molded to fourth size-adjusting cap 68.
14) Cylindrical lock 71 is engaged with cylindrical-lock key 73 (FIGS. 11, 12, and 13).
15) Cylindrical-lock locking hole 72 is molded from one side to another of cylindrical lock 71.
16) Cylindrical-lock key 73 is engaged with cylindrical lock 71.
17) Cylindrical-lock key hole 74 is formed at one end of cylindrical lock 71.
18) Locking-pin handle 75 is molded to one end of locking-pin body 76.
19) Locking-pin body 76 is molded to locking-pin tip 77.
20) Locking-pin tip 77 is molded to locking-pin body 76.
21) Locking notches 78 each are machined on locking-pin body 76 at desire locations, respectively.

Function

Referring to FIGS. 3, 4, 5, 6, 7, 8, 9, 10, 11, 12, and 13:
1) Locking ball 58 is for being inserted into a hitch-ball receiver (FIGS. 3 and 4).
2) Locking-ball neck 59 is for connecting locking ball 58 to locking-ball body 60.
3) Locking-ball body 60 is for connecting locking-ball neck 59 to locking-ball ring 61.
4) Locking-ball ring 61 is for a cable to be attached thereto.
5) Locking-ball through-hole 62 is for first and second hollow shafts 65 and 66, respectively.
6) First size-adjusting cap 63 is for increasing the size of locking ball 58 (FIGS. 5, 6, and 7).
7) Second size-adjusting cap 64 is for increasing the size of locking ball 58.
8) First hollow shaft 65 is for being inserted into locking-ball through-hole 62.
9) Second hollow shaft 66 is for being inserted into locking-ball through-hole 62.
10) Third size-adjusting cap 67 is for increasing the size of first size-adjusting cap 63 (FIGS. 8, 9, and 10).
11) Fourth size-adjusting cap 68 is for increasing the size of second size-adjusting cap 64.
12) Third solid shaft 69 is for being inserted into first hollow shaft 65.
13) Fourth solid shaft 70 is for being inserted into second hollow shaft 66.
14) Cylindrical lock 71 is for locking locking-pin body 76 (FIGS. 11, 12, and 13).
15) Cylindrical-lock locking hole 72 is for locking-pin body 76 to be inserted therethrough.
16) Cylindrical-lock key 73 is for switching cylindrical lock 71 between locking and unlocking modes.
17) Cylindrical-lock key hole 74 is for receiving cylindrical-lock key 73.
18) Locking-pin handle 75 is for handling locking-pin body 76.
19) Locking-pin body 76 is for being inserted through cylindrical-lock locking hole 72.
20) Locking-pin tip 77 is for guiding locking-pin body 76 through cylindrical-lock locking hole 72.
21) Locking notches 78 each are for cylindrical lock 71 to engage to lock locking-pin body 76 in place.

Operation

Example 1 (Locking a 1⅞-Inch Hitch-Ball Receiver)

Figure 14:
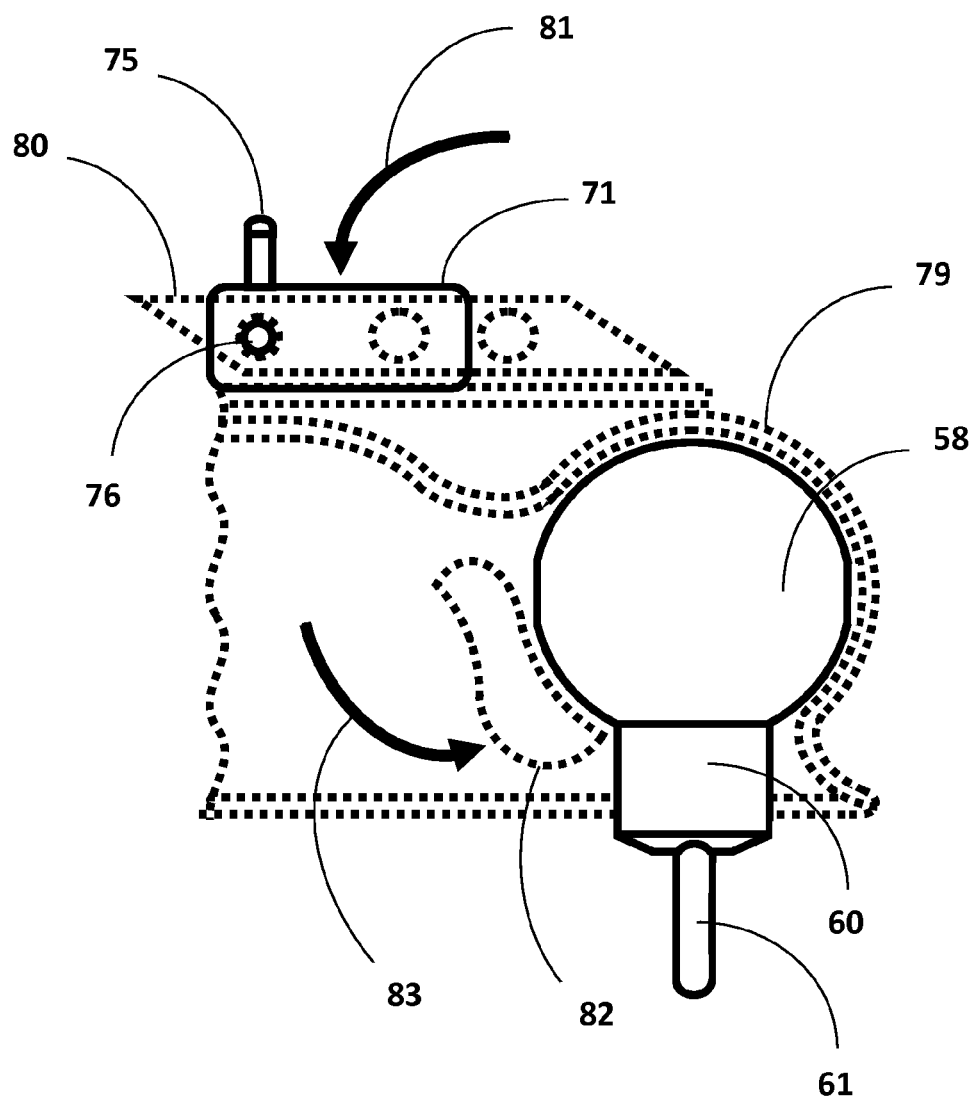
FIG. 14 illustrates how snuggly the unique quick-size-release, quick-size-assembly, and quick-size-switch trailer lock fits inside a 1⅞-inch hitch-ball receiver.

Referring to FIGS. 4 and 14, the operation of the unique adjustable trailer-locking system (having the unique quick-size-release, quick-size-assembly, and quick-size-switch trailer lock with the capabilities of quick size release, quick size assembly, and quick size switch to snuggly fit inside hitch-ball receivers of all three standardized sizes, to eliminate the cavities or gaps between the unique quick-size-release, quick-size-assembly, and quick-size-switch trailer lock and the hitch-ball receivers of all three standardized sizes, to better withstand hammering forces to prevent trailer theft, to eliminate the needs for buying many trailer locks of all three standardized sizes, to offer safety and convenience, and to save materials, spaces, time, and money) comprises:
1) Inserting locking ball 58 into a hitch-ball receiver 79 (FIG. 14);

2) Pulling down a receiver lever 80, in the direction of arrow 81, to rotate a receiver jaw 82, in the direction of arrow 83;
3) Inserting locking-pin body 76 through receiver lever 80;
4) Inserting locking-pin body 76 through cylindrical-lock locking hole 72 of cylindrical lock 71;
5) Inserting cylindrical-lock key 73 into cylindrical-lock key hole 74; and
6) Turning cylindrical-lock key 73 to lock locking-pin body 76 in cylindrical lock 71, to lock locking ball 58 inside hitch-ball receiver 79.

Example 2 (Locking a 2-Inch Hitch-Ball Receiver)

Figure 15:
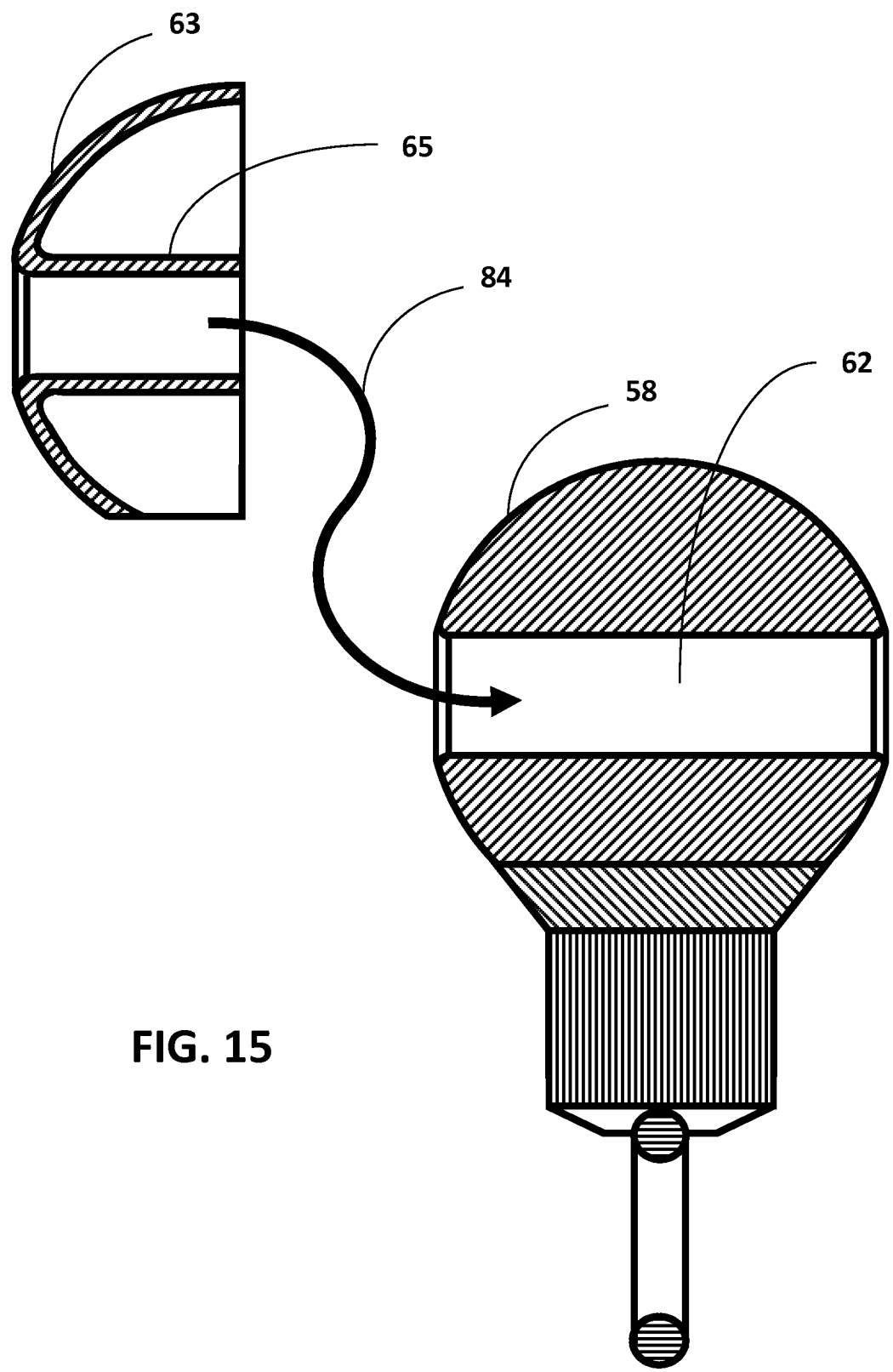
FIG. 15 illustrates a cross-sectional view of how the first size-adjusting cap fits on the unique quick-size-release, quick-size-assembly, and quick-size-switch trailer lock.
Figure 16:
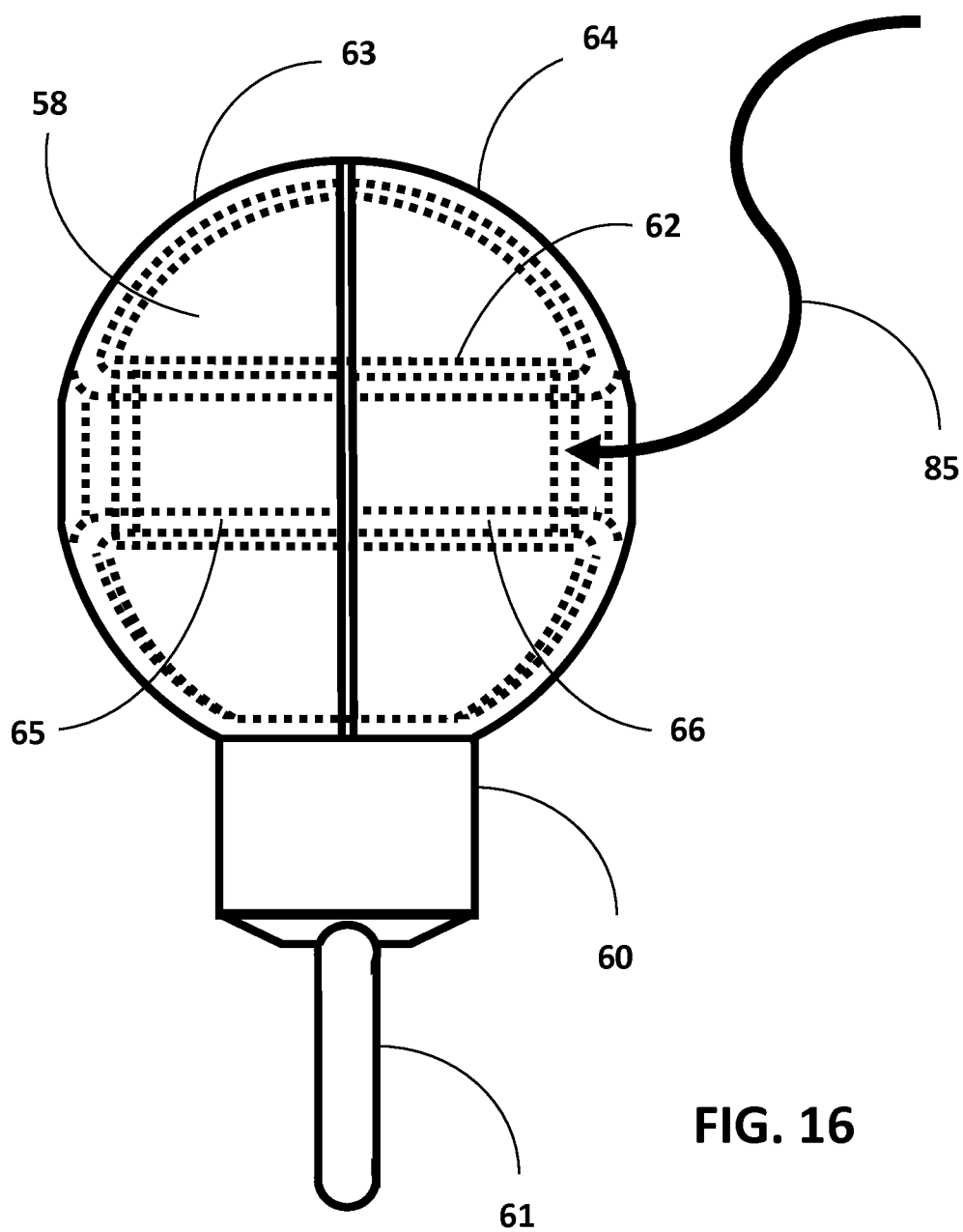
FIG. 16 illustrates a side view of how the first and second size-adjusting caps fit on the unique quick-size-release, quick-size-assembly, and quick-size-switch trailer lock.
Figure 17:
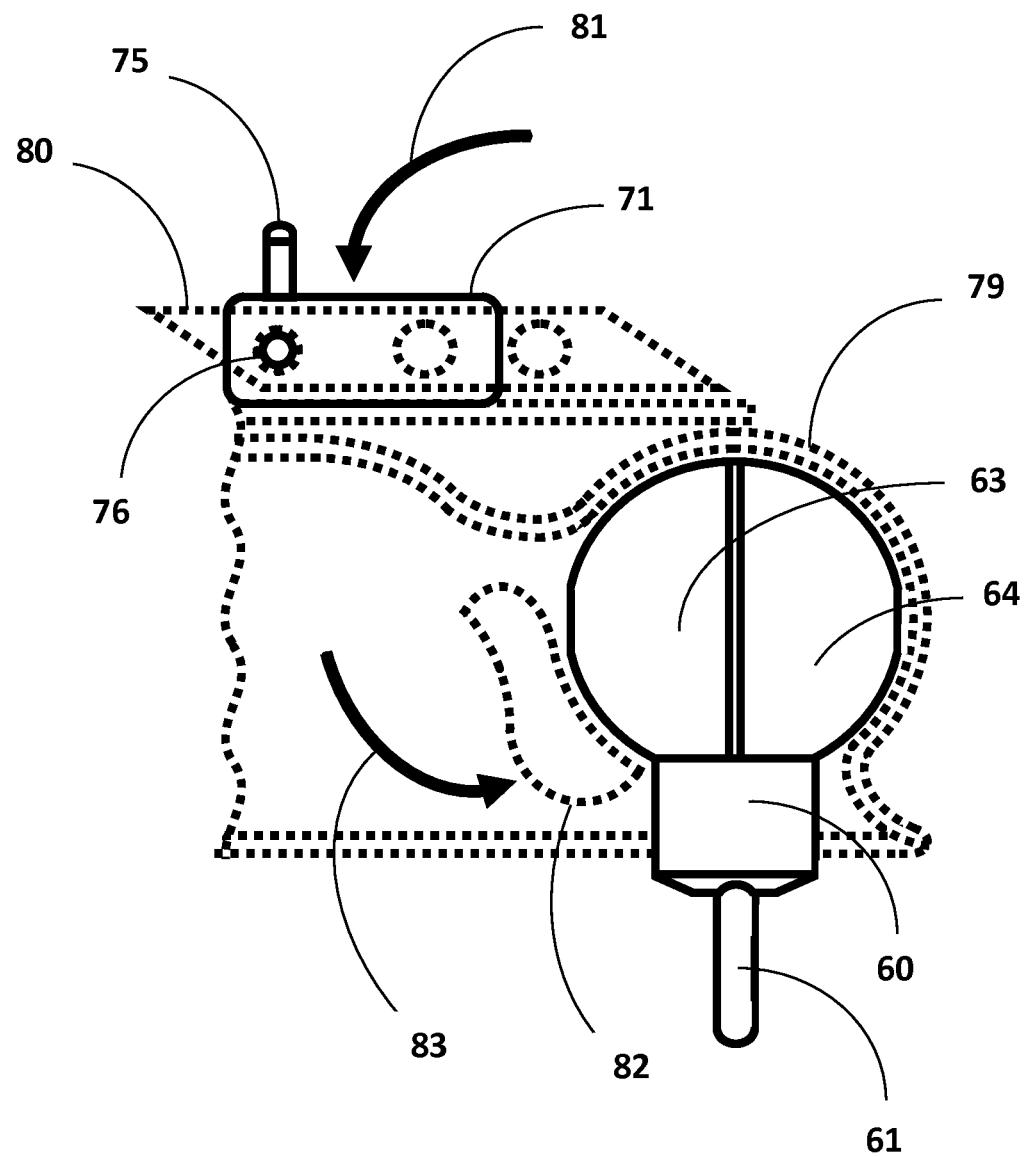
FIG. 17 illustrates how snuggly the unique quick-size-release, quick-size-assembly, and quick-size-switch trailer lock fits inside a 2-inch hitch-ball receiver.

Referring to FIGS. 15, 16, and 17, the operation of the unique adjustable trailer-locking system comprises:
1) Sliding first hollow shaft 65 into locking-ball through-hole 62, in the direction of arrow 84, to increase the size of locking ball 58 (FIG. 15);
2) Sliding second hollow shaft 66 into locking-ball through-hole 62, in the direction of arrow 85, to increase the size of locking ball 58 (FIG. 16);
3) Inserting first and second size-adjusting caps 63 and 64 into a hitch-ball receiver 79 (FIG. 17);
4) Pulling down a receiver lever 80, in the direction of arrow 81, to rotate a receiver jaw 82, in the direction of arrow 83;
5) Inserting locking-pin body 76 through receiver lever 80;
6) Inserting locking-pin body 76 through cylindrical-lock locking hole 72 of cylindrical lock 71;
7) Inserting cylindrical-lock key 73 into cylindrical-lock key hole 74; and
8) Turning cylindrical-lock key 73 to lock locking-pin body 76 in cylindrical lock 71, to lock locking ball 58 and first and second size-adjusting caps 63 and 64 inside hitch-ball receiver 79.

Example 3 (Locking a 2 5/16-Inch Hitch-Ball Receiver)

Figure 18:
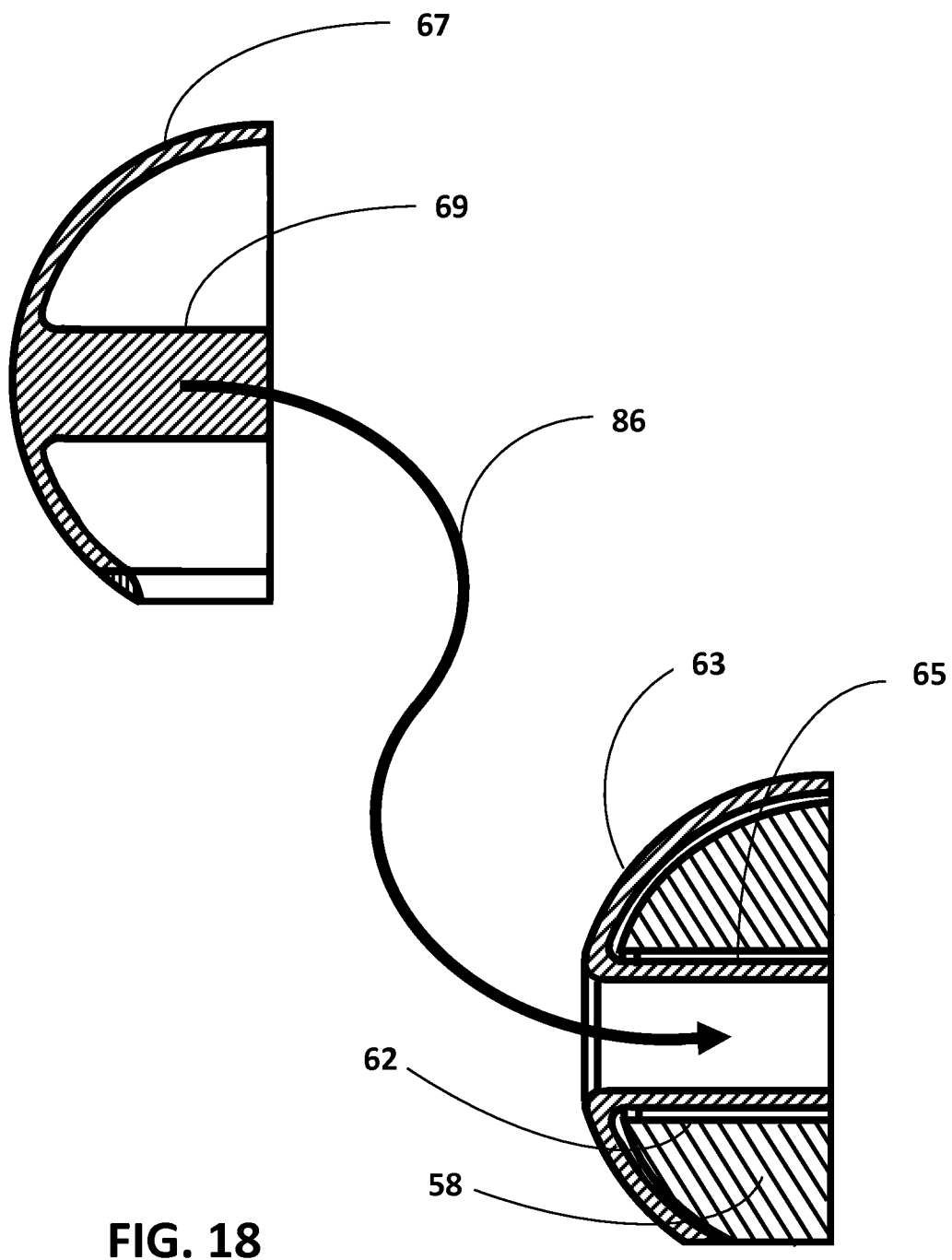
FIG. 18 illustrates a cross-sectional view of how the third size-adjusting cap fits on the first size-adjusting cap.
Figure 19:
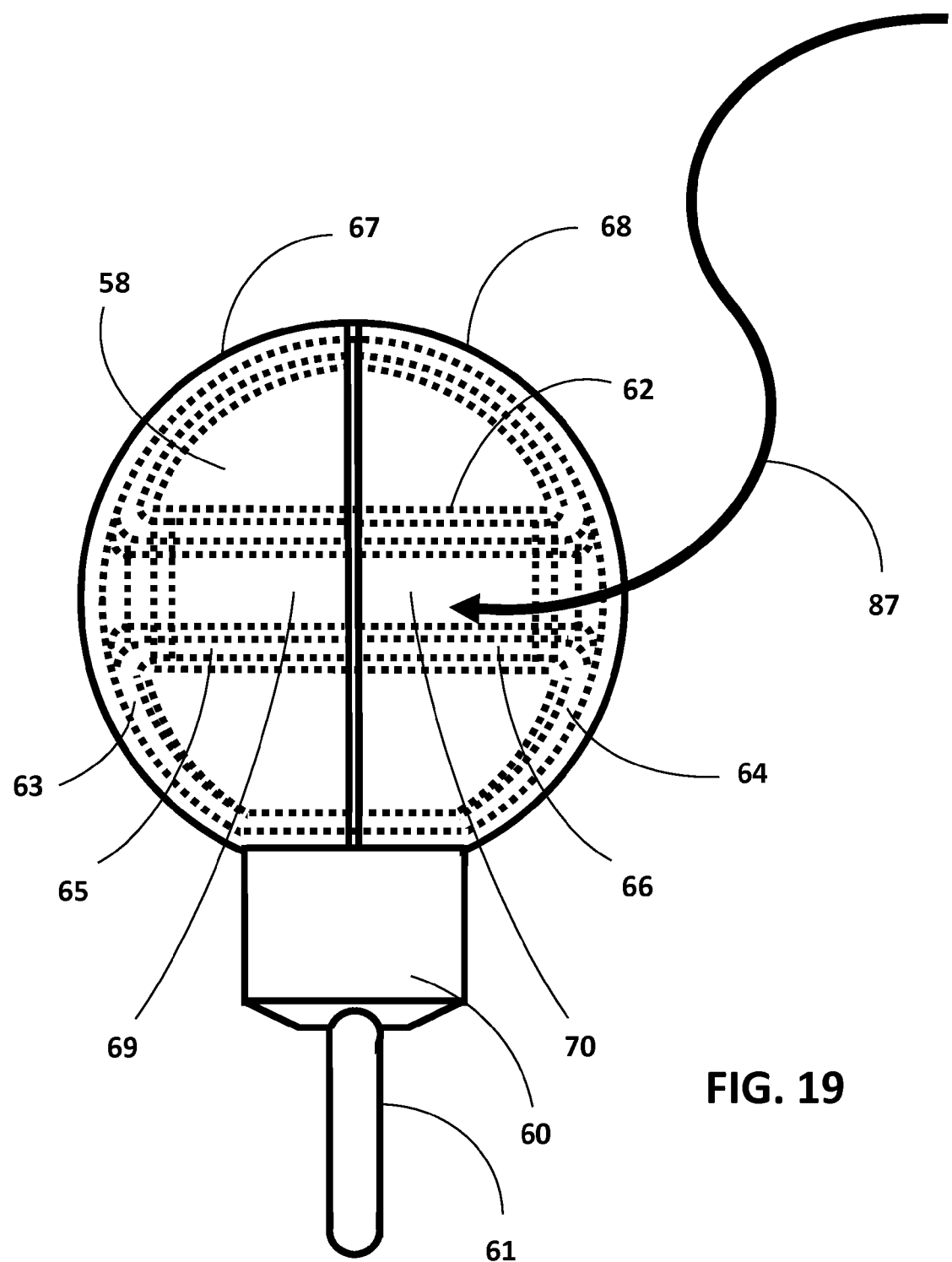
FIG. 19 illustrates a side view of how the third and fourth size-adjusting caps fit on the first and second size-adjusting caps.
Figure 20:
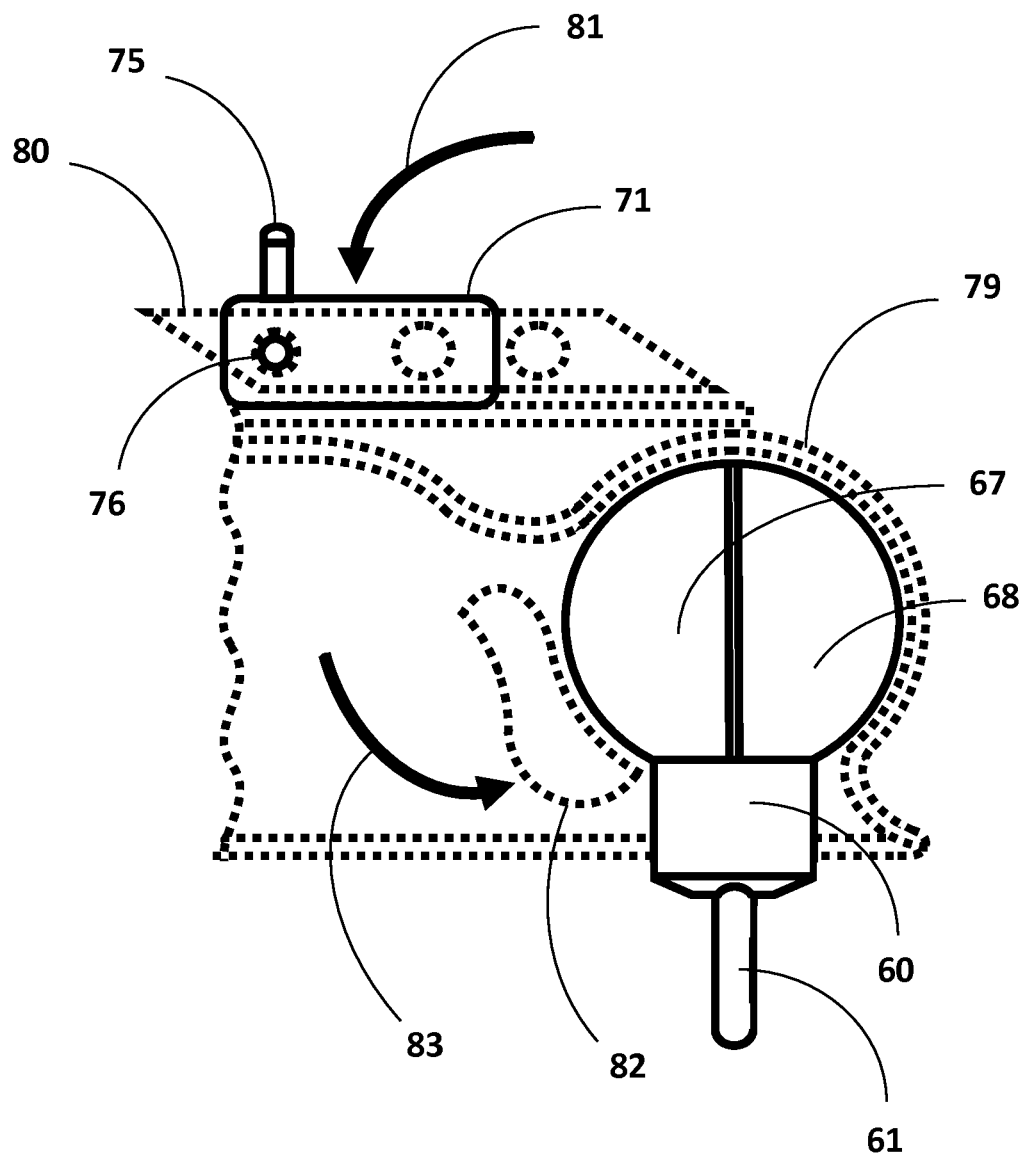
FIG. 20 illustrates how snuggly the unique quick-size-release, quick-size-assembly, and quick-size-switch trailer lock fits inside a 2⁵⁄₁₆-inch hitch-ball receiver.

Referring to FIGS. 18, 19, and 20, the operation of the unique adjustable trailer-locking system comprises:
1) Sliding third solid shaft 69 into first hollow shaft 65, in the direction of arrow 86, to increase the size of locking ball 58 (FIG. 18);
2) Sliding fourth solid shaft 70 into second hollow shaft 66, in the direction of arrow 87, to increase the size of locking ball 58 (FIG. 19);
3) Inserting third and fourth size-adjusting caps 67 and 68 into a hitch-ball receiver 79 (FIG. 20);
4) Pulling down a receiver lever 80, in the direction of arrow 81, to rotate a receiver jaw 82, in the direction of arrow 83;
5) Inserting locking-pin body 76 through receiver lever 80;
6) Inserting locking-pin body 76 through cylindrical-lock locking hole 72 of cylindrical lock 71;
7) Inserting cylindrical-lock key 73 into cylindrical-lock key hole 74; and
8) Turning cylindrical-lock key 73 to lock locking-pin body 76 in cylindrical lock 71, to lock locking ball 58 and third and fourth size-adjusting caps 67 and 68 inside hitch-ball receiver 79.

Advantage

Referring to FIGS. 14, 17, and 20:
1) The unique adjustable trailer-locking system provides the following advantages (FIGS. 14, 17, and 20):
   a) The unique quick-size-release, quick-size-assembly, and quick-size-switch trailer lock snuggly fits inside a hitch-ball receiver of any of three standardized sizes (for example, a 1 7/8-inch hitch-ball receiver, a 2-inch hitch-ball receiver, and a 2 5/16-inch hitch-ball receiver);
   b) The unique quick-size-release, quick-size-assembly, and quick-size-switch trailer lock eliminates the cavities between the unique quick-release, quick-assembly, quick-size-switch trailer lock and a hitch-ball receivers of any of three standardized sizes (for example, a 1 7/8-inch hitch-ball receiver, a 2-inch hitch-ball receiver, and a 2 5/16-inch hitch-ball receiver), to prevent a crowbar from being inserted therebetween to pry the unique quick-size-release, quick-size-assembly, and quick-size-switch trailer lock off or to damage it, to prevent trailer theft;
   c) The unique quick-size-release, quick-size-assembly, and quick-size-switch trailer lock prevents a crowbar from being inserted between the unique quick-release, quick-assembly, quick-size-switch trailer lock and a hitch-ball receiver of any of three standardized sizes to pry it off or to damage it; and
   d) The unique quick-size-release, quick-size-assembly, and quick-size-switch trailer lock prevents trailer theft.
2) The unique adjustable trailer-locking system provides the following advantages (FIGS. 14, 17, and 20):
   a) The unique quick-size-release, quick-size-assembly, and quick-size-switch trailer lock eliminates the needs for buying many trailer locks of three standardized sizes for many hitch-ball receivers of three standardized sizes
      (for example, a 1 7/8-inch hitch-ball receiver, a 2-inch hitch-ball receiver, and a 2 5/16-inch hitch-ball receiver);
   b) The unique quick-size-release, quick-size-assembly, and quick-size-switch trailer lock requires low production cost; and
   c) The unique quick-size-release, quick-size-assembly, and quick-size-switch trailer lock saves materials, space, time, and money.
3) The unique adjustable trailer-locking system provides the following advantages (FIGS. 14, 17, and 20):
   a) The unique quick-size-release, quick-size-assembly, and quick-size-switch trailer lock has the capabilities of quick size release, quick size assembly, and quick size switch;
   b) The unique quick-size-release, quick-size-assembly, and quick-size-switch trailer lock offers the protection of being able to quickly and easily switch itself from one size to another; and
   c) The unique quick-size-release, quick-size-assembly, and quick-size-switch trailer lock offers convenience.
4) The unique adjustable trailer-locking system provides the following advantages (FIGS. 14, 17, and 20):
   a) The unique quick-size-release, quick-size-assembly, and quick-size-switch trailer lock eliminates the problem of prior-art trailer locks being defeated;
   b) The unique quick-size-release, quick-size-assembly, and quick-size-switch trailer lock requires no tool to operate; and
   c) The unique quick-size-release, quick-size-assembly, and quick-size-switch trailer lock is safe to operate.
5) The unique adjustable trailer-locking system provides the following advantages (FIGS. 14, 17, and 20):
   a) The unique quick-size-release, quick-size-assembly, and quick-size-switch trailer lock has a simple, solid core;

b) The unique quick-size-release, quick-size-assembly, and quick-size-switch trailer lock withstands hammering forces better than the prior-art trailer locks (for example, the unique quick-size-release, quick-size-assembly, and quick-size-switch trailer lock can be made of metallic materials); and c) The unique quick-size-release, quick-size-assembly, and quick-size-switch trailer lock is compact.

6) The unique adjustable trailer-locking system provides the following advantages (FIGS. 14, 17, and 20):
   a) The unique quick-size-release, quick-size-assembly, and quick-size-switch trailer lock is simple to manufacture;
   b) The unique quick-size-release, quick-size-assembly, and quick-size-switch trailer lock is affordable;
   c) The unique quick-size-release, quick-size-assembly, and quick-size-switch trailer lock is reliable;
   d) The unique quick-size-release, quick-size-assembly, and quick-size-switch trailer lock is safe to use; and
   e) The unique quick-size-release, quick-size-assembly, and quick-size-switch trailer lock eliminates personal injuries.

Variation

Referring to FIGS. 3, 4, 5, 6, 7, 8, 9, 10, 11, 12, 13, and 14:
1) Locking ball 58 can be any shape and size.
2) Locking-ball neck 59 can be any shape and size.
3) Locking-ball body 60 can be any shape and size.
4) Locking-ball ring 61 can be any shape and size.
5) Locking-ball through-hole 62 can be any shape and size.
6) First size-adjusting cap 63 can be any shape and size.
7) Second size-adjusting cap 64 can be any shape and size.
8) First hollow shaft 65 can be any shape and size.
9) Second hollow shaft 66 can be any shape and size.
10) Third size-adjusting cap 67 can be any shape and size.
11) Fourth size-adjusting cap 68 can be any shape and size.
12) Third solid shaft 69 can be any shape and size.
13) Fourth solid shaft 70 can be any shape and size.
14) Cylindrical lock 71 can be any shape and size.
15) Cylindrical-lock locking hole 72 can be any shape and size.
16) Cylindrical-lock key 73 can be any shape and size.
17) Cylindrical-lock key hole 74 can be any shape and size.
18) Locking-pin handle 75 can be any shape and size.
19) Locking-pin body 76 can be any shape and size.
20) Locking-pin tip 77 can be any shape and size.
21) Locking notches 78 each can be any shape and size.

Figure 21:
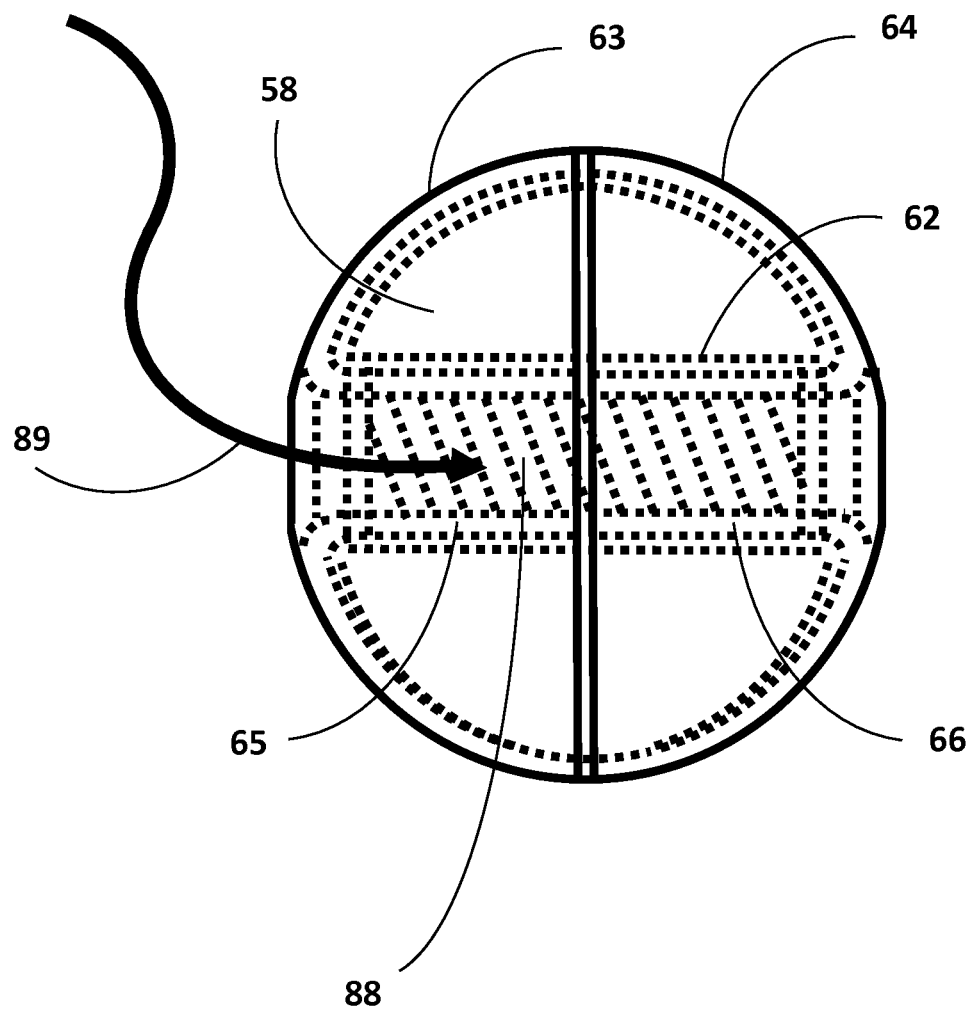
FIG. 21 illustrates a side view of how variations of the size-adjusting caps fit on a variation of the unique quick-size-release, quick-size-assembly, and quick-size-switch trailer lock.
Figure 22:
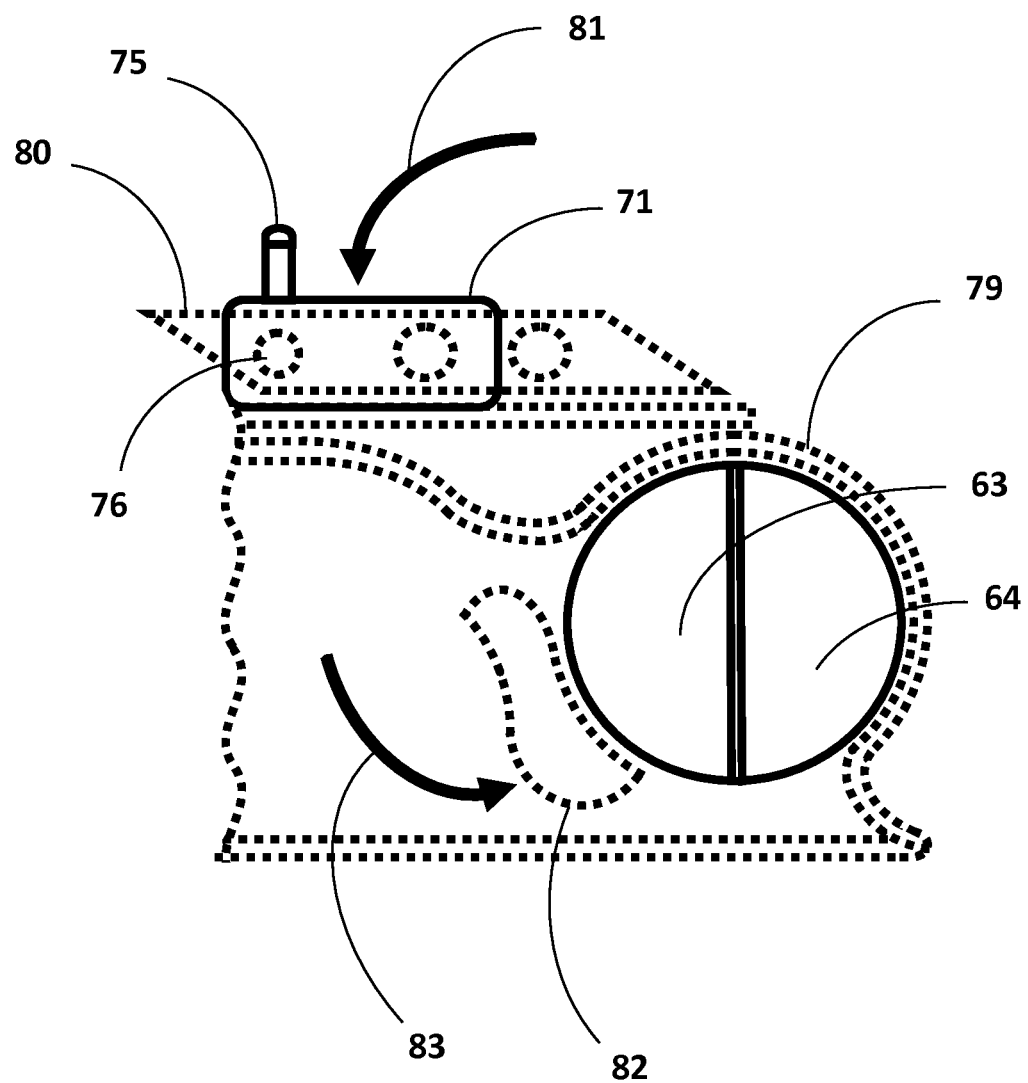
FIG. 22 illustrates how snuggly the variation of the unique quick-size-release, quick-size-assembly, and quick-size-switch trailer lock can quickly switch its size to fit inside hitch-ball receivers of all standardized sizes (1⅞ inches, 2 inches, and 2⁵⁄₁₆ inches).

Any of size-adjusting caps of the unique adjustable trailer-locking system can have mating thread such that the unique adjustable trailer-locking system only needs two, instead of four, size-adjusting caps. For example, first hollow shaft 65 can be screwed on second hollow shaft 66 with mating threads 88, in the direction of arrow 89 (FIGS. 21 and 22), to adjust the sizes of locking ball 58, to eliminate third and fourth size-adjusting caps 67 and 68 from the unique adjustable trailer-locking system. The unique adjustable trailer-locking system can be built with or without locking-ball neck 59, locking-ball body 60, and locking-ball ring 61.

OBJECTS AND ADVANTAGES OF THE INVENTION

Prior-art trailer locks have had many disadvantages. For example, FIG. 1 (PRIOR ART) illustrates a prior-art trailer lock 50 (having a 1⅞-inch diameter), not being able to lock a hitch-ball receiver (having a 2-inch diameter or a 2 5/16-inch diameter), and not being able to eliminate multiple cavities 51, 52, 53, and 54 between prior-art trailer lock 50 and the hitch-ball receiver. As a result, a crowbar could be inserted into multiple cavities 51, 52, 53, and 54 and pry out prior-art trailer lock 50.

Figure 2:
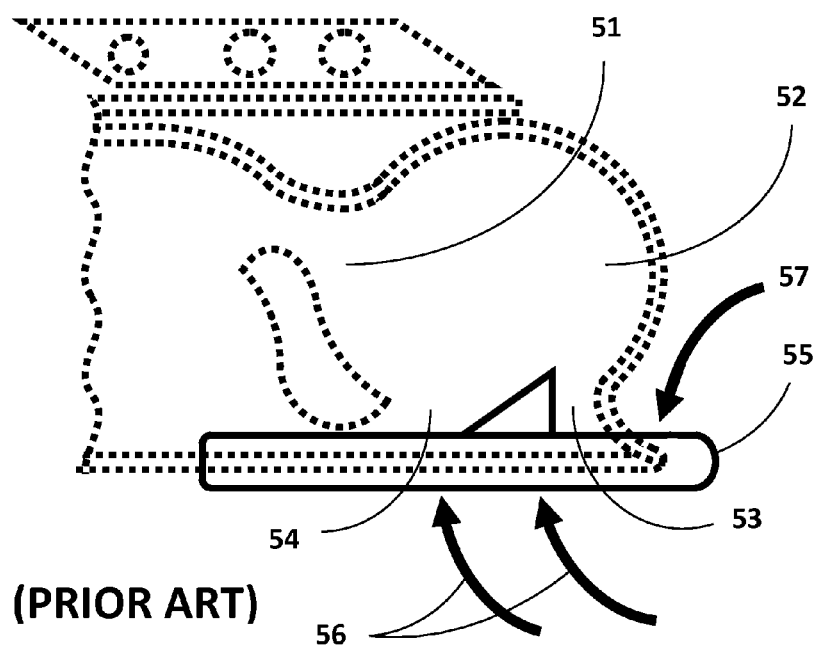
FIG. 2 (PRIOR ART) illustrates a prior-art-bolt trailer lock for locking a hitch-ball receiver.
Figures 8, 9:
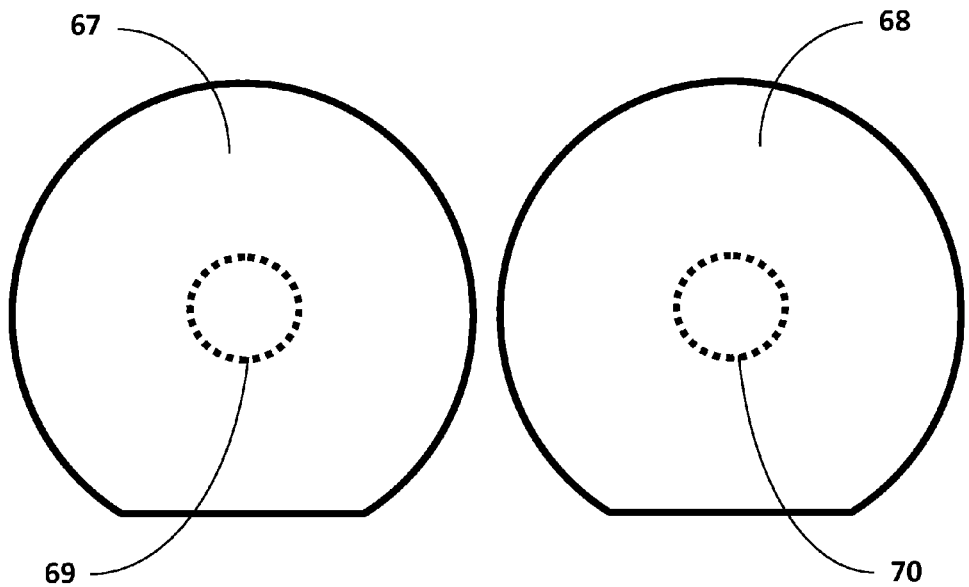
FIG. 8 illustrates a front view of a third size-adjusting cap.
FIG. 9 illustrates a front view of a fourth size-adjusting cap.
Figure 10:
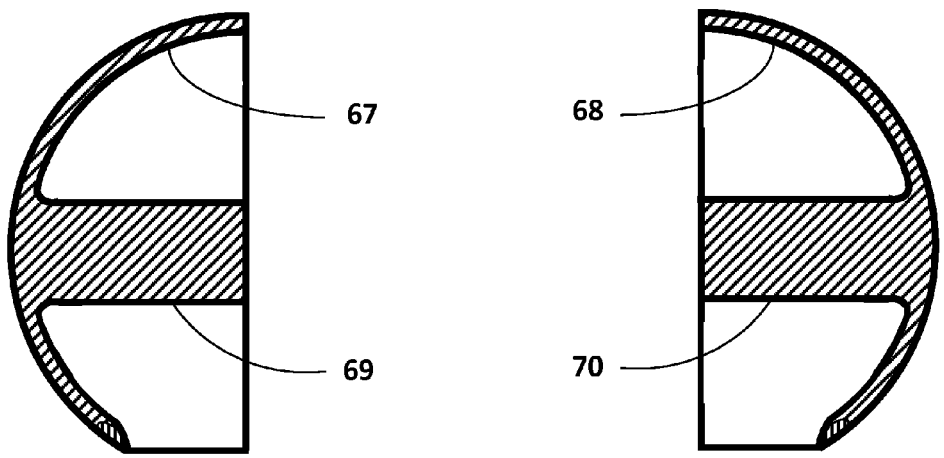
FIG. 10 illustrates a cross-sectional view of the third size-adjusting cap.
Figures 11, 12, 13:
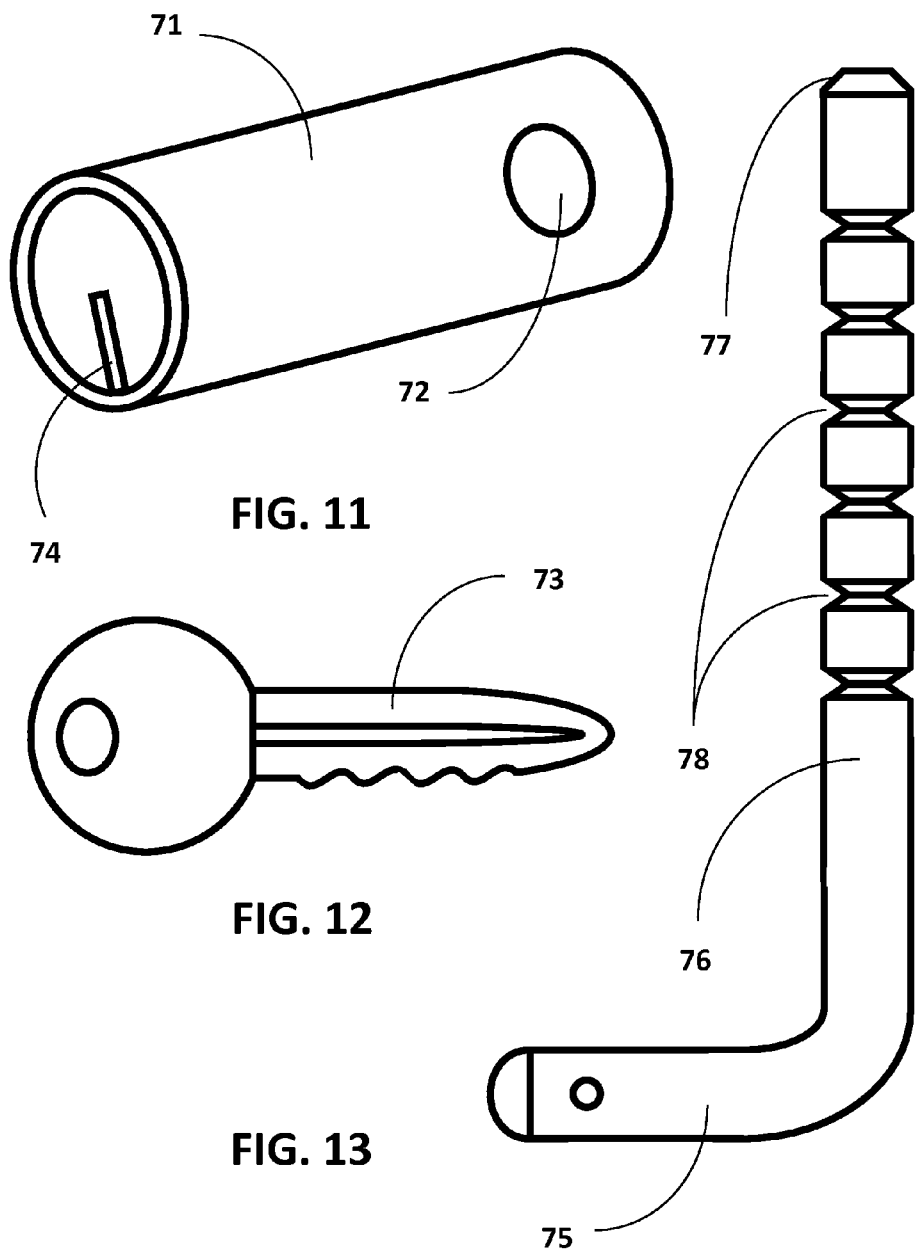
FIG. 11 illustrates a perspective view of a cylindrical lock.
FIG. 12 illustrates a front view of a cylindrical-lock key.
FIG. 13 illustrates a front view of a locking-pin handle, locking-pin body, and locking-pin tip.

For another example, FIG. 2 (PRIOR ART) illustrates another prior-art trailer lock 55, not being able to eliminate multiple cavities 51, 51, 53, and 54 inside a hitch-ball receiver. As a result, hammering forces in the directions of arrows 56 and 57 could bend prior-art trailer lock 55 toward multiple cavities 51, 51, 53, and 54, and disable prior-art trailer lock 55.

The present invention substantially departs from the conventional concepts and designs of the prior art. In doing so, the present invention provides a unique adjustable trailer-locking system, having multiple unique capabilities of quick size release, quick size assembly, and quick size switch, all of which have many unique functions and advantages, which overcome all the disadvantages of the prior art, as follows:

1) It is an object of the present invention to provide a unique adjustable trailer-locking system, having a unique quick-size-release, quick-size-assembly, and quick-size-switch trailer lock, which can:
   a) Snuggly fit inside a hitch-ball receiver of any of all three standardized sizes (for example, a 1⅞-inch hitch-ball receiver, a 2-inch hitch-ball receiver, and a 2 5/16-inch hitch-ball receiver);
   b) Prevent a crowbar from being inserted between the unique quick-size-release, quick-size-assembly, and quick-size-switch trailer lock and a hitch-ball receiver of any of all three standardized sizes to pry it off or to damage it, to prevent trailer theft;
   c) Prevent a crowbar from prying the unique quick-size-release, quick-size-assembly, and quick-size-switch trailer lock off a hitch-ball receiver of any of all three standardized sizes; and
   d) Prevent trailer theft.

2) It is another object of the present invention to provide the unique adjustable trailer-locking system, having the unique quick-size-release, quick-size-assembly, and quick-size-switch trailer lock, which can:
   a) Eliminate the cavities or gaps between the unique quick-size-release, quick-size-assembly, and quick-size-switch trailer lock and a hitch-ball receiver of any of all three standardized sizes (for example, a 1⅞-inch hitch-ball receiver, a 2-inch hitch-ball receiver, and a 2 5/16-inch hitch-ball receiver), to prevent trailer theft;
   b) Prevent a crowbar from being inserted between the unique quick-size-release, quick-size-assembly, and quick-size-switch trailer lock and a hitch-ball receiver of any of all three standardized sizes to pry it off; and
   c) Prevent trailer theft.

3) It is still another object of the present invention to provide the unique adjustable trailer-locking system, having the unique quick-size-release, quick-size-assembly, and quick-size-switch trailer lock, which can:
   a) Have the capabilities of quick size release, quick size assembly, and quick size switch;
   b) Eliminate the needs for buying many trailer locks of three standardized sizes for many hitch-ball receivers of three standardized sizes (for example, a 1⅞-inch hitch-ball receiver, a 2-inch hitch-ball receiver, and a 2 5/16-inch hitch-ball receiver); and
   c) Save materials, spaces, time, and money.

4) It is a further object of the present invention to provide the unique adjustable trailer-locking system, having the unique quick-size-release, quick-size-assembly, and quick-size-switch trailer lock, which can:
  a) Offer convenience by being able to quickly and easily switch itself from one size to another;
  b) Offer protection by being able to quickly and easily switch itself from one size to another; and
  c) Offer ease of use by being able to quickly and easily switch itself from one size to another.
5) It is an even further object of the present invention to provide the unique adjustable trailer-locking system, having the unique quick-size-release, quick-size-assembly, and quick-size-switch trailer lock, which can:
  a) Be simple to operate;
  b) Be simple to manufacture; and
  c) Reduce production costs.
6) It is still another object of the present invention to provide the unique adjustable trailer-locking system, having the unique quick-size-release, quick-size-assembly, and quick-size-switch trailer lock, which can:
  a) Withstand hammering forces better than the prior-art trailer locks to prevent trailer theft; and
  b) Eliminate the problem of prior-art trailer locks defeated by a crowbar and a hammer; and
  c) Deter trailer theft by snuggly fitting inside a hitch-ball receiver of any of all three standardized sizes to eliminate all cavities between the unique quick-size-release, quick-size-assembly, and quick-size-switch trailer lock and the hitch-ball receivers of all three standardized sizes, to prevent a crowbar from being inserted therebetween to pry it off.
7) It is yet a further object of the present invention to provide the unique adjustable trailer-locking system, having the unique quick-size-release, quick-size-assembly, and quick-size-switch trailer lock, which can:
  a) Require no tool to operate;
  b) Be easy to operate; and
  c) Be reliable.
8) It is still an even further object of the present invention to provide the unique adjustable trailer-locking system, having the unique quick-size-release, quick-size-assembly, and quick-size-switch trailer lock, which can:
  a) Be compact;
  b) Be affordable;
  c) Be safe to operate; and
  d) Eliminate personal injuries.

What is claimed is:

1. An adjustable trailer-locking system, capable of quick size switches for fitting inside hitch-ball-receivers of multiple sizes to eliminate cavities therein to disable them to prevent theft, comprising:
  a ball, said ball having a spherical shape, said ball having a through-hole molded through said ball and along the central axis of said ball, said ball for fitting inside and disabling one of said hitch-ball-receivers to prevent foreign objects from being inserted therebetween to prevent theft;
  a neck, said neck having a frustum shape, said neck having a top surface and a bottom surface, said top surface attached to said ball such that said top surface is parallel with said through-hole of said ball;
  a body, said body having a round cylindrical shape, said body having a top end and a bottom end, said top end attached to said bottom surface of said neck;
  a ring, said ring attached to said bottom end of said body, said ring for holding on to operate said ball;
  a first cap,
    said first cap having a dome shape, said first cap having a first center;
  a first shaft,
    said first shaft being hollow, said first shaft attached to said first center;
  a second cap,
    said second cap having a dome shape, said second cap having a second center,
    said first and said second caps for releasably and oppositely covering and increasing the size of said ball to fit inside and to disable one of said hitch-ball-receivers to prevent foreign objects from being inserted therebetween to prevent theft;
  a second shaft,
    said second shaft being hollow, said second shaft attached to said second center,
    said first and said second shafts for releasably and oppositely being inserted into said through-hole of said ball;
  a third cap,
    said third cap having a dome shape, said third cap having a third center;
  a third shaft,
    said third shaft being solid, said third shaft attached to said third center;
  a fourth cap,
    said fourth cap having a dome shape, said fourth cap having a fourth center,
    said third and said fourth caps for releasably and oppositely covering and increasing the size of said first and said second caps respectively to fit inside and to disable one of said hitch-ball-receivers to prevent foreign objects from being inserted therebetween to prevent theft; and
  a fourth shaft,
    said fourth shaft being solid, said fourth shaft attached to said fourth center,
    said third and said fourth shafts for releasably and oppositely being inserted into said first and said second shafts respectively.

2. The adjustable trailer-locking system of claim 1, wherein, the adjustable trailer-locking system is partially or entirely made of one or more metallic materials.

3. The adjustable trailer-locking system of claim 1, wherein, the adjustable trailer-locking system is partially or entirely made of one or more plastic composite materials.

4. The adjustable trailer-locking system of claim 1, further, comprising a lever, a plurality of lever holes drilled through said lever, a locking arm, a lock having a key hole, a key, and a locking pin, said lever swivelingly connected to said locking arm such that said locking arm locks said ball inside one of said hitch-ball-receivers when said lever is pushed down, and such that said locking arm unlocks said ball from one of said hitch-ball-receivers when said lever is lifted up, said lock for interlocking with said locking pin and said lever when said locking pin is inserted through said lock and said lever, said key for being inserted into said key hole to switch said lock between locking said locking pin and unlocking said locking pin.

5. An adjustable trailer-locking system, capable of quick size switches for fitting inside hitch-ball-receivers of multiple sizes to eliminate cavities therein to disable them to prevent theft, comprising:
  a ball, said ball having a spherical shape, said ball having a through-hole molded through said ball and along the central axis of said ball, said ball for fitting inside and disabling one of said hitch-ball-receivers to prevent foreign objects from being inserted therebetween to prevent theft;

a first cap,
   said first cap having a dome shape, said first cap having a first center;

a first shaft,
   said first shaft being hollow, said first shaft attached to said first center;

a second cap,
   said second cap having a dome shape, said second cap having a second center,
   said first and said second caps for releasably and oppositely covering and increasing the size of said ball to fit inside and to disable one of said hitch-ball-receivers to prevent foreign objects from being inserted therebetween to prevent theft;

a second shaft,
   said second shaft being hollow, said second shaft attached to said second center,
   said first and said second shafts for releasably and oppositely being inserted into said through-hole of said ball;

a third cap,
   said third cap having a dome shape, said third cap having a third center;

a third shaft,
   said third shaft being solid, said third shaft attached to said third center;

a fourth cap,
   said fourth cap having a dome shape, said fourth cap having a fourth center,
   said third and said fourth caps for releasably and oppositely covering and increasing the size of said first and said second caps respectively to fit inside and to disable one of said hitch-ball-receivers to prevent foreign objects from being inserted therebetween to prevent theft; and a fourth shaft,
   said fourth shaft being solid, said fourth shaft attached to said fourth center,
   said third and said fourth shafts for releasably and oppositely being inserted into said first and said second shafts respectively.

6. The adjustable trailer-locking system of claim 5, wherein, the adjustable trailer-locking system is partially or entirely made of one or more metallic materials.

7. The adjustable trailer-locking system of claim 5, wherein, the adjustable trailer-locking system is partially or entirely made of one or more plastic composite materials.

8. The adjustable trailer-locking system of claim 5, further, comprising a lever, a plurality of lever holes drilled through said lever, a locking arm, a lock having a key hole, a key, and a locking pin, said lever swivelingly connected to said locking arm such that said locking arm locks said ball inside one of said hitch-ball receivers when said lever is pushed down, and such that said locking arm unlocks said ball from one of said hitch-ball receivers when said lever is lifted up, said lock for interlocking with said locking pin and said lever when said locking pin is inserted through said lock and said lever, said key for being inserted into said key hole to switch said lock between locking said locking pin and unlocking said locking pin.

* * * * *